(12) United States Patent
Jones

(10) Patent No.: US 7,108,007 B1
(45) Date of Patent: Sep. 19, 2006

(54) FAUCET SECURING AND WATER SUPPLY DEVICE

(76) Inventor: Isaac Noland Jones, P.O. Box 20815, El Cajon, CA (US) 92021

( * ) Notice: Subject to any disclaimer, the term of this patent is extended or adjusted under 35 U.S.C. 154(b) by 0 days.

(21) Appl. No.: 11/266,677

(22) Filed: Nov. 4, 2005

(51) Int. Cl.
F16L 5/00 (2006.01)
(52) U.S. Cl. ...................... 137/359; 137/801
(58) Field of Classification Search ............. 137/359, 137/801
See application file for complete search history.

(56) References Cited

U.S. PATENT DOCUMENTS 5,950,663 A * 9/1999 Bloomfield ................ 137/359
6,385,798 B1 * 5/2002 Burns et al. .................... 4/675

* cited by examiner

Primary Examiner—A. Michael Chambers

(57) ABSTRACT

A faucet securing and water supply device that is a rigid hollow tubular fitting with a threaded flange shaped upper surface designed to secure faucet to sink. Also has a threaded bottom end for attachment to water supply line which may be preceded by a hexagonal or other geometric shape to facilitate use of various wrenches. Length of tube is to extend far enough downward to make easy access.

2 Claims, 2 Drawing Sheets

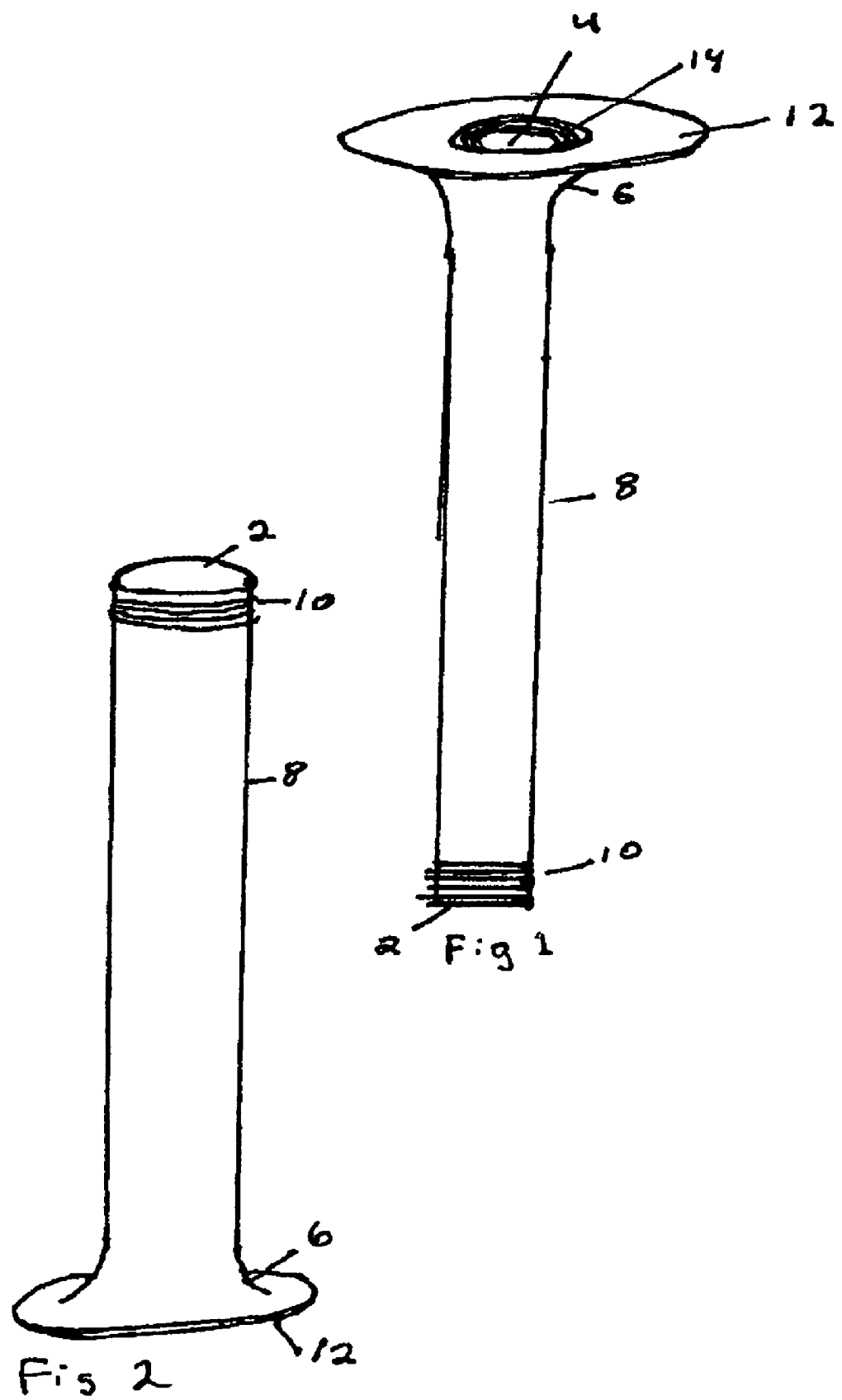

FAUCET SECURING AND WATER SUPPLY DEVICE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

The Present Invention relates to general plumbing in the mounting of lavatory and sink faucets, specifically to securing of faucet and ease of attaching water supply lines using an extension tube with one end encircled by a flange to mount a faucet to a sink comprised of piping materials approved by plumbing codes.

2. Background of Invention

Plumbers and homeowners alike have for years had to get under the sink in awkward and cramped conditions and use frustrating tools to install a faucet. This mounting device solves that problem, and makes future water supply lines or faucet replacement far easier.

BACKGROUND DISCUSSION OF PRIOR ART

In prior Art basically consisted of a plastic female threaded washer that was very difficult to attach because of reasons:

1. The access area up under sinks are to difficult to reach and the tools designed are cumbersome even for professionals and if you finally succeed in attaching the washer, you would have the same problem attaching the water supply line with even more problems removing it later for faucet replacement.

2. Other attempts have been made by making faucets that attach above the sink.

OBJECTS AND ADVANTAGES

Accordingly, several objects and advantages of my invention are:

(a) You can now attach a faucet to a sink from far below the counter and sink surface.

(b) It provides for a more securely attached faucet.

(c) There is no need for cumbersome faucet tools.

(d) Removal and replacement of future faucets will be quicker and easier.

(e) Water supply lines can be attached and removed with easy access and effort from the lower end of the device.

(f) Further objects and advantages of my invention will be apparent from a consideration of the drawings and ensuing descriptions.

SUMMARY

The faucet and supply mounting Device of the present invention is a rigid tubular unit. It has an upper end surrounded by an extended flat surface which end attaches to supply end of faucet at the same time securing faucet to sink with a rigid hollow tubular section which lower end attaches to water supply line. In the case of the homeowner or the professional, the device is of great assistance, making easy replacement of faucet and supply line from far below the cramped areas of the upper interior counter region. Also in case of future replacement of sink or supply line, simple standard tools such as a pipe wrench or open end wrench can be used. Too, the composition, design and materials are such that manufacturing can be inexpensive and with little modification to standard methods.

OPERATION OF INVENTION

Homeowner or plumber would simply attach upper device end (14) to faucet water inlet below hole in sink then screw tightly until flat widened contact surface (12) is snug and secure to under side of sink holding faucet in place. Wrench can be used on pipe tubular (8) to tighten, then water supply line can be connected to lower device bottom (10). Water travels thru bottom end of hollow tube (2) out of top of hollowed tube (4) to faucet.

CONCLUSION, RAMIFICATIONS AND SCOPE OF INVENTION

While my above description contains many specificities, these should not be construed as limitations on the scope of invention, but rather as an exemplification of one preferred embodiment thereof. Body of invention may be designed as to accommodate different types of wrenches. Many other variations are possible. For example, different dimensions, end materials, geometric shapes or threading.

BRIEF DESCRIPTION OF DRAWING

FIG. 1 A prospective view of faucet and supply mounting device showing upper opening and mounting contact surface FIG. 2 Upside down view showing lower opening for thread FIG. 3 A view of present invention with faucet illustrated in phantom. The broken line view of the faucet and sink in FIG. 3 are for purpose of illustration only and form no part of the claimed design.

DETAILED DESCRIPTION OF THE PREFERRED EMBODIMENT

Figure 3:
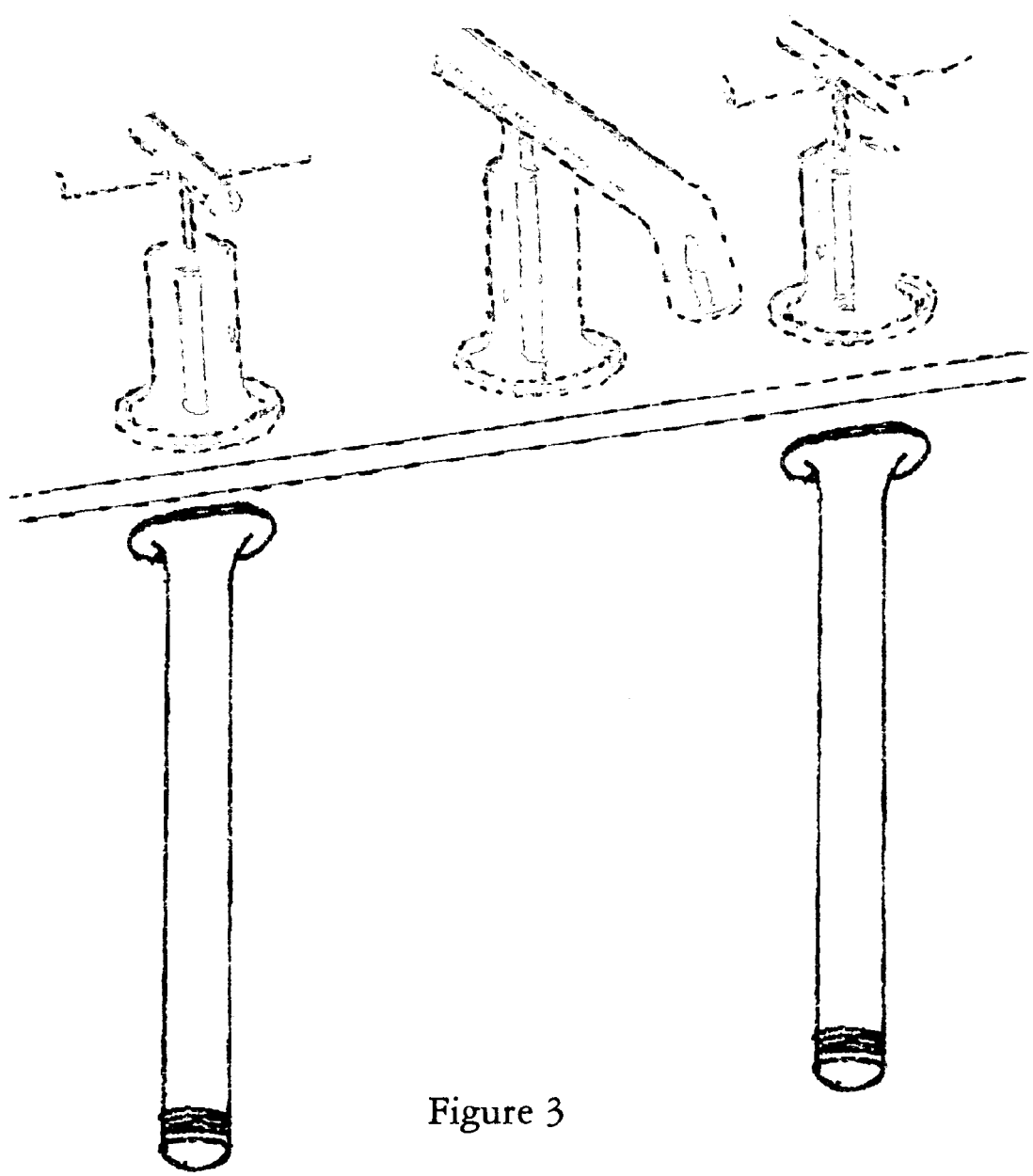

1. As illustrated in the accompanying drawing, the present invention is concerned with a faucet securing and water supply device generally referred to by the reference #1 in FIGS. (1) & (3)

With reference to FIG. 1. Shows full side view of Device, hollow inner tube top view with upper female thread. (4) Flat widened contact surface (12) wider upper tube for female thread (6) cylinder tube on pile body (8) a male pipe bottom thread (10) location of bottom end of hollow of tube (2) or pipe body.

2. In the following descriptions, like reference numbers refer to corresponding illustrations thru out several views and variations of the present invention. In the following descriptions it is to be understood that such terms as top, bottom, right, left, inside and outside, dimensions, thread types and the like are words of convenience and are not to be construed as limiting terms.

The invention claimed is:

1. A faucet securing and water line attachment device comprising an elongated rigid tubular body having an internal surface, an external surface and a flat surface on one end, said flat surface being perpendicular to said elongated rigid tubular body and having a diameter larger than a faucet aperture in a sink or a counter said internal surface of said end being threaded for receiving a threaded base of a faucet extending through a faucet aperture in a sink or a counter securing a faucet to a sink or a counter, and the other end being threaded on said external surface to receive a water line, said elongated rigid tubular body having a length that extends from a faucet aperture in a sink or a counter to about a base of a sink basin underside.

2. A faucet securing and water line attachment device according to claim 1 wherein said external surface of said elongated rigid tubular body preceding said threading on said other end is hexagonal in shape.

* * * * *